US005661542A

United States Patent [19]

Morita

[11] Patent Number: 5,661,542

[45] Date of Patent: Aug. 26, 1997

[54] APPARATUS AND METHOD OF RECORDING AN IMAGE IN WHICH THE DEVELOPING MATERIAL IS HELD, PRESSED, HEATED, AND CONVEYED

[75] Inventor: Naoyuki Morita, Kanagawa, Japan

[73] Assignee: Fuji Photo Film Co., Ltd., Kanagawa, Japan

[21] Appl. No.: 476,675

[22] Filed: Jun. 7, 1995

[30] Foreign Application Priority Data

Jul. 15, 1994 [JP] Japan .................................... 6-164421

[51] Int. Cl.$^6$ .................................................... G03B 27/52

[52] U.S. Cl. ............................. 355/27; 219/216; 219/469

[58] Field of Search .................................... 219/216, 469, 219/470, 471; 355/27, 28

[56] References Cited

U.S. PATENT DOCUMENTS

| | | | |
|---|---|---|---|
| 3,849,628 | 11/1974 | Abowitz et al. | 219/216 |
| 3,922,083 | 11/1975 | Freeman et al. | 355/13 |
| 4,723,152 | 2/1988 | Ohtorii et al. | 355/28 |
| 4,864,352 | 9/1989 | Morita | 355/27 |
| 4,942,422 | 7/1990 | Mashiko et al. | 355/28 |
| 4,945,382 | 7/1990 | Yui et al. | 355/27 |
| 4,952,781 | 8/1990 | Kozaiku | 219/469 |
| 5,162,635 | 11/1992 | Sato et al. | 219/216 |
| 5,198,641 | 3/1993 | Nagano et al. | 219/544 |
| 5,285,049 | 2/1994 | Fukumoto et al. | 219/216 |
| 5,304,784 | 4/1994 | Tagashira et al. | 219/543 |
| 5,306,898 | 4/1994 | Yukawa et al. | 219/543 |
| 5,391,861 | 2/1995 | Ooyama et al. | 219/543 |
| 5,411,825 | 5/1995 | Tam | 430/41 |

*Primary Examiner*—Arthur T. Grimley
*Assistant Examiner*—Herbert Kerner
*Attorney, Agent, or Firm*—Sughrue, Mion, Zinn, Macpeak & Seas

[57] ABSTRACT

In an image recording apparatus, a photosensitive material is pulled out from a magazine and is conveyed to an exposure section in which an image is formed on the photosensitive material by exposure. When the photosensitive material reaches a switchback section, it is reversely conveyed by a predetermined length. The exposed portion is cut off by cutting blades, and is passed through the exposure section again. A guide plate is moved to cause the photosensitive material to proceed inside the guide plate and then move to a heat-development/transfer section via a water applying section. An image receiving material having a predetermined length is taken out from another magazine by a sucking/conveying section, and is then conveyed to the heat-development/transfer section by rollers. The photosensitive material and the image receiving material are conveyed along a straight path by endless belts while being held therebetween so that the photosensitive material is subjected to heat-development. As a result, an image corresponding to the original image is transferred to the image receiving material. After the transfer of the image, the photosensitive material and the image receiving material are separated from each other. The photosensitive material is collected into a collecting section in the body of the apparatus while the image receiving material is fed onto a tray provided outside the body.

20 Claims, 9 Drawing Sheets

APPARATUS AND METHOD OF RECORDING AN IMAGE IN WHICH THE DEVELOPING MATERIAL IS HELD, PRESSED, HEATED, AND CONVEYED

BACKGROUND OF THE INVENTION

1. Field of the Invention

The present invention relates to an apparatus and method of recording an image, and more particularly to an image recording apparatus and a method of recording an image which an image formed on a heat-development type photosensitive material by exposure is subjected to heat-development and is then transferred to an image receiving material so as to record the image thereon.

2. Description of the Related Art

In a conventional image recording apparatus, an image formed on a heat-development type photosensitive material is subjected to heat-development and is then transferred to an image receiving material so as to record the image thereon. The image recording apparatus is provided with a photosensitive material magazine for storing a rolled heat-development type photosensitive material. The photosensitive material is pulled out from the photosensitive material magazine by a predetermined length necessary for forming an image thereon by exposure. The photosensitive material thus pulled out is cut and is then conveyed to an exposure section where an image is formed on the photosensitive material by exposure. After completion of the exposure, the photosensitive material is conveyed to a heat-development/transfer section via a water applying section. The image recording apparatus is also provided with an image receiving material magazine for storing a rolled image receiving material. The image receiving material is pulled out from the image receiving material magazine and is then conveyed to the heat-development/transfer section. In the heat-development/transfer section, the photosensitive material and image receiving material are conveyed around a cylindrical heating drum in a state in which they closely contact each other. The photosensitive material and image receiving material conveyed around the heating drum are both heated by heat from a halogen lamp built into the heating drum. As a result, the image formed on the photosensitive material by exposure is heat-developed and is transferred to the image receiving material.

In the heat-development section of the image recording apparatus, the photosensitive material and the image receiving material must be conveyed around the cylindrical heating drum. Therefore, a large space is needed to convey the photosensitive material and the image receiving material around the heating drum. Also, since the heating drum has a cylindrical shape, wasted space exists around the heating drum.

Also, the image receiving material magazine of the image recording apparatus must have a cylindrical space therein to store a rolled image receiving material. Accordingly, a large space is needed and wasted space exists therein.

In the image recording apparatus, the photosensitive material is pulled out from the photosensitive material magazine by a predetermined length necessary for forming an image thereon by exposure, cut, and then conveyed to the exposure section in which an image is formed on the photosensitive material by exposure. Consequently, a large space is necessary to pull out the photosensitive material from the magazine by a predetermined length necessary for forming an image thereon by exposure.

For the above-described reasons, the conventional image recording apparatus has the drawbacks of having a large size and high costs.

SUMMARY OF THE INVENTION

An object of the present invention is to provide a compact image recording apparatus which can be manufactured at reduced costs.

The present invention generally provides an image recording apparatus which includes a photosensitive material storing section for storing a rolled photosensitive material, photosensitive material conveying means for pulling out the photosensitive material from the storing section and for conveying the pulled out photosensitive material, an exposure section for forming an image, by exposure, on a part of the photosensitive material which has been pulled out and conveyed by the photosensitive material conveying means, an image receiving material storing section for storing an image receiving material, image receiving material conveying means for conveying the image receiving material stored in the image receiving material storing section, cutting means for cutting the photosensitive material to a predetermined length after being exposed in the exposure section, and a heat-development/transfer section which superposes the photosensitive material cut by the cutting means on the image receiving material conveyed by the image receiving material conveying means so as to effect heat-development and transfer.

In detail, in the image recording apparatus according to a first aspect of the present invention, the heat-development/transfer section comprises a pair of endless belts each forming a straight holding portion along a part of its path of movement and adapted to hold the superposed photosensitive material and the image receiving material between the straight holding portions to convey them, pressing means for pressing at least one of the straight holding portions of the endless belts to cause the photosensitive material and the image receiving material held between the straight holding portions to closely contact each other, and heating means for heating the photosensitive material and the image receiving material held between the straight holding portions.

According to a second aspect of the present invention, additional features are added to the first aspect, such that the image receiving material storing section stores a plurality of pieces of an image receiving material which are cut to a predetermined length and are stacked up, and the image receiving material conveying means conveys each piece of the image receiving material from the image receiving material storing section by sucking each piece of the image receiving material with negative pressure.

According to a third aspect of the present invention, additional features are added to the second aspect. That is, the photosensitive material conveying means pulls out the photosensitive material from the photosensitive material storing section and conveys the photosensitive material such that the photosensitive material passes through the exposure section to form an image on the photosensitive material in the exposure section, and the exposed portion of the photosensitive material again passes through the exposure section. The exposed portion of the photosensitive material is cut off by the cutting means to a predetermined length and is conveyed to the heat-development/transfer section.

In the first aspect, the rolled photosensitive material stored in the photosensitive material storing section is pulled out and is then conveyed. The exposure section forms an image, by exposure, on the photosensitive material conveyed by the photosensitive material conveying means. The cutting means cuts off the exposed portion of the photosensitive material to a predetermined length. The image receiving material conveying means conveys the image receiving material stored in the image receiving material storing section.

The pair of endless belts of the heat-development/transfer section form straight holding portions along part of their paths of movement and hold the photosensitive material and the image receiving material between the straight holding portions, in a superposed state, to convey them. The pressing means presses at least one of the straight holding portions of the endless belts to cause the photosensitive material and the image receiving material held between the straight holding portions to closely contact each other. The heating means heats the photosensitive material and the image receiving material held between the straight holding portions. With this operation, the photosensitive material cut to a predetermined length by the cutting means and the image receiving material conveyed by the image receiving material conveying means are superposed on each other and are then subjected to heat-development and transfer.

As described above, the closely contacting photosensitive material and the image receiving material are linearly conveyed in the heat-development/transfer section. Consequently, a space for the heat-development/transfer section can be reduced compared to a conventional heat-development/transfer section in which a photosensitive material and an image receiving material are transferred by rotation of a cylindrical heating drum and are heated thereby for heat-development and transfer. That is, a conventional heat-development/transfer section requires space for the heating drum itself and space for conveying the photosensitive material and the image receiving material around the periphery of the heating drum. Since this space can be eliminated in the present invention, the heat-development/transfer section can be made compact. Accordingly, the overall size of the image recording apparatus can be made smaller.

A plurality of heating means may be arranged in a planar pattern such as a matrix or a staggered pattern. Also, the plurality of heating means may be arranged such that the density of the heaters becomes higher at the side portions of the pressing means compared to the central portion thereof. The heating means heats the photosensitive material and the image receiving material such that the planar distribution of heat becomes substantially uniform when the heat-development and transfer are effected for the photosensitive material and the image receiving material. Alternatively, an original image having a uniform density is formed on the photosensitive material by exposure and is then passed through a heating path to form an image corresponding to the original image on the image receiving material by the heating means. The distribution of the density of the thus obtained image is measured. The target temperatures of the plurality of heating means are set based on the results of the measurement such that the distribution of the density of the image formed on the image receiving material becomes uniform. The photosensitive material and the image receiving material are heated at the target temperatures which have been set in the above-described manner.

As described above, the photosensitive material and the image receiving material are heated in a state where the planar distribution of heat is uniform during the heat-development and transfer. Therefore, the temperatures of the photosensitive material and the image receiving material become uniform when the photosensitive material and the image receiving material are subjected to heat-development and transfer. As a result, a proper image can be formed on the image receiving material while reducing the unevenness of the density of the image to a predetermined level.

Also, since a plurality of pieces of image receiving material which have been cut to a predetermined length are stacked in the storing section, the space for the image receiving material storing section can be made smaller than for an image receiving material storing section which requires a cylindrical section to store an image receiving material in a rolled state. That is, it is possible to eliminate cylindrical space for storing a rolled image receiving material, thereby making the image receiving material storing section compact. Hence the image recording apparatus can be made compact.

As described above, the photosensitive material conveying means pulls out the photosensitive material from the photosensitive material storing section and subsequently conveys the photosensitive material such that the photosensitive material passes through the exposure section to form an image on the photosensitive material in the exposure section. Accordingly, the space for the conveying means can be made smaller compared to a conventional image recording apparatus in which a photosensitive material stored in a storing section is pulled out by a predetermined amount necessary for forming an image thereon by exposure and is cut before exposing the image on the photosensitive material. Such a conventional image recording apparatus requires a large space to pull out the photosensitive material by a predetermined length necessary for forming an image on the photosensitive material by exposure. Since this space can be eliminated in the present invention, the size of the image recording apparatus can be reduced.

DESCRIPTION OF THE PREFERRED EMBODIMENT

An embodiment of the present invention will be described in detail with reference to the accompanying drawings. FIG.

1 schematically shows the overall structure of an image recording apparatus 10 according to the present embodiment.

Figure 1:
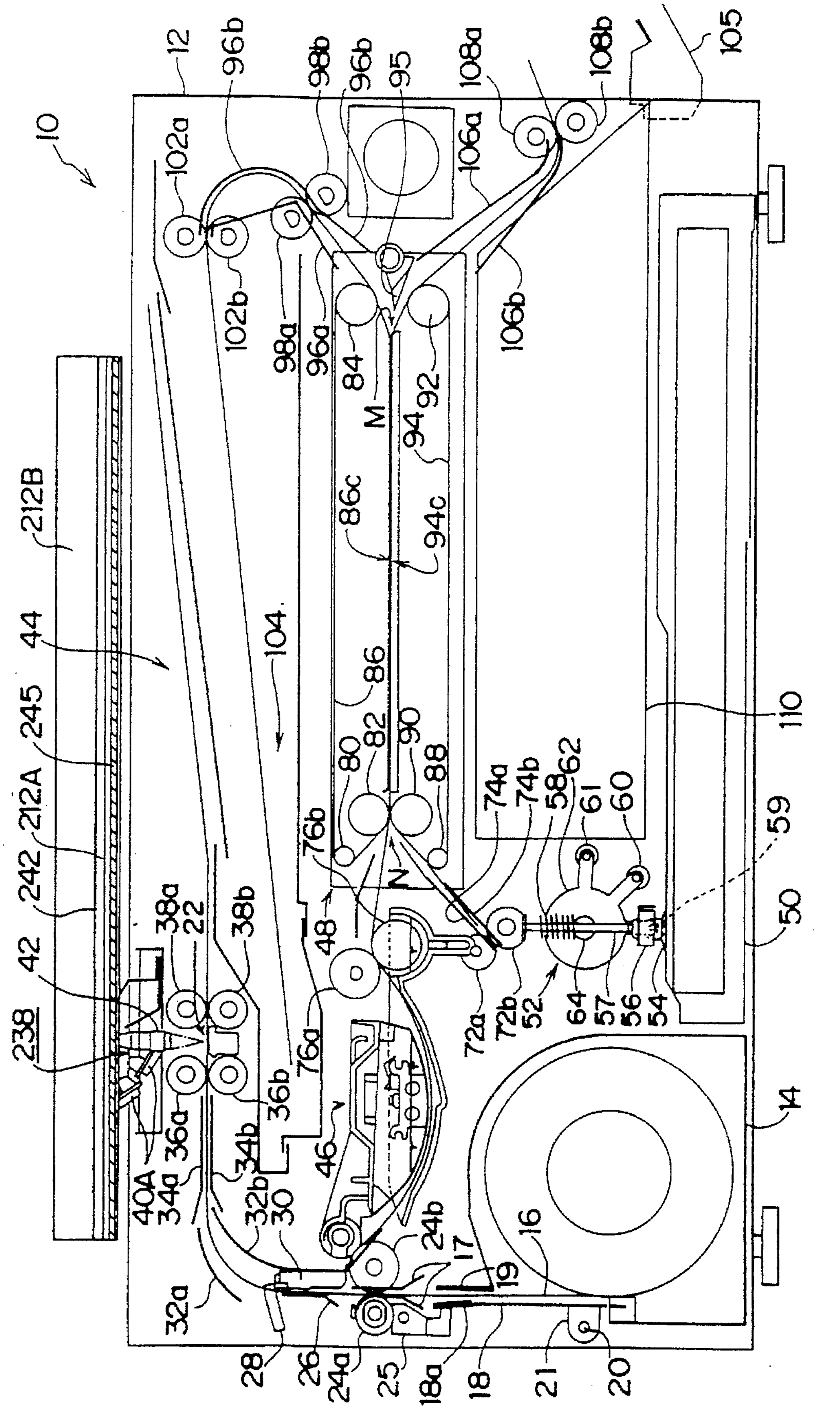
FIG. 1 is a cross sectional side view of an image recording apparatus according to an embodiment of the present invention.

As shown in FIG. 1, the image recording apparatus 10 generally has a box-like shape. A body 12 of the image recording apparatus 10 is provided with a front door and side doors, which can be opened to expose the inside structure of the body 12 to the outside.

Provided on the top of the body 12 of the image recording apparatus 10 is a table 212A on which an object 242 with an image to be recorded is placed. The table 212A is supported by unillustrated rails for movement in the right-and-left direction in FIG. 1. The table 212A is provided with a rectangular opening to which a transparent glass plate 245 is mounted. A holding cover 212B is provided above the transparent glass plate 245 and is pivoted such that it is opened and closed by pivoting about an axis in the vicinity of the side of the holding cover 212B which is located at the rear side of the body 12. An unillustrated operational panel is also provided on the top surface of the body 12.

As shown in FIG. 1, a photosensitive material magazine 14 is disposed in the body 12 of the image recording apparatus 10, and a heat-development type photosensitive material 16 is stored therein in a rolled state. The photosensitive material 16 is rolled such that the photosensitive surface which is exposed faces toward the outside of the photosensitive material magazine 14.

Holding plates 18 and 19 are provided in the vicinity of the outlet of the photosensitive material magazine 14. A pair of guide plates 17 and a pair of conveying rollers 24*a* and 24*b* are disposed above the holding plates 18 and 19. The left-hand side conveying roller 24*a* is supported by a support 25.

Figure 2:
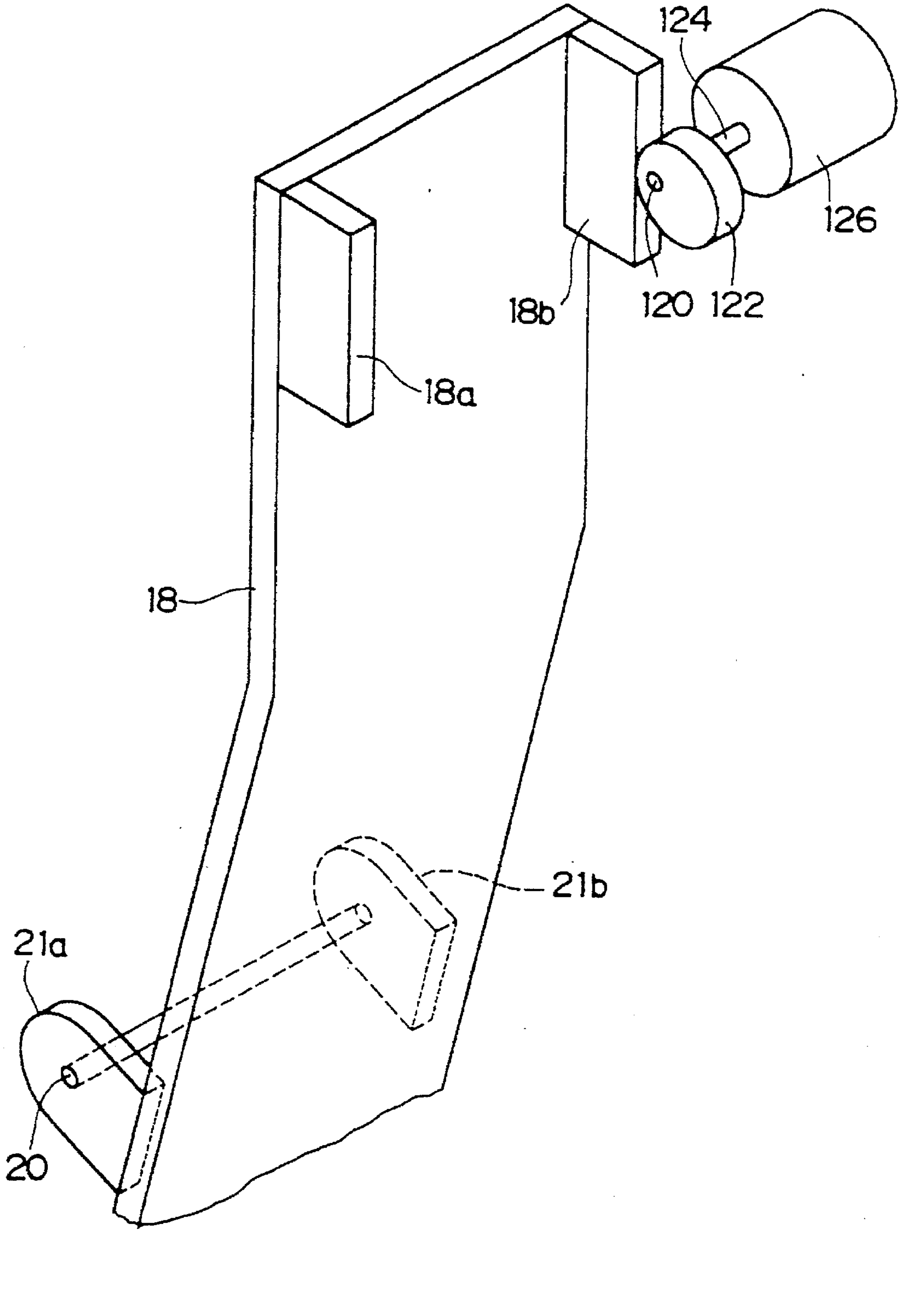
FIG.2 is a schematic perspective view of the holding plate of the image recording apparatus.

As shown in FIG. 2, a pair of side plates 18*a* and 18*b* is attached to the holding plate 18. An eccentric cam 122 is in contact with the side plate 18*b* with pressure. The eccentric shaft 120 of the eccentric cam 122 is connected to a motor 126 via a shaft 124. The holding plate 18 is urged by an unillustrated spring to always contact the eccentric cam 122 with pressure. A pair of bearing members 21*a* and 21*b* is attached to both lateral edges of the lower portion of the holding plate 18, and a stationary shaft 20 is passed through the bearing members 21*a* and 21*b*. Accordingly, when the eccentric cam 122 is rotated by the motor 126 via the shaft 124, the holding plate 18 is swung about the stationary shaft 20. The holding plate 18 is selectively toward the holding plate 19 to contact it with pressure and is swung back to separate from the holding plate 19, as shown in FIG. 3 and FIG. 4.

Figure 3:
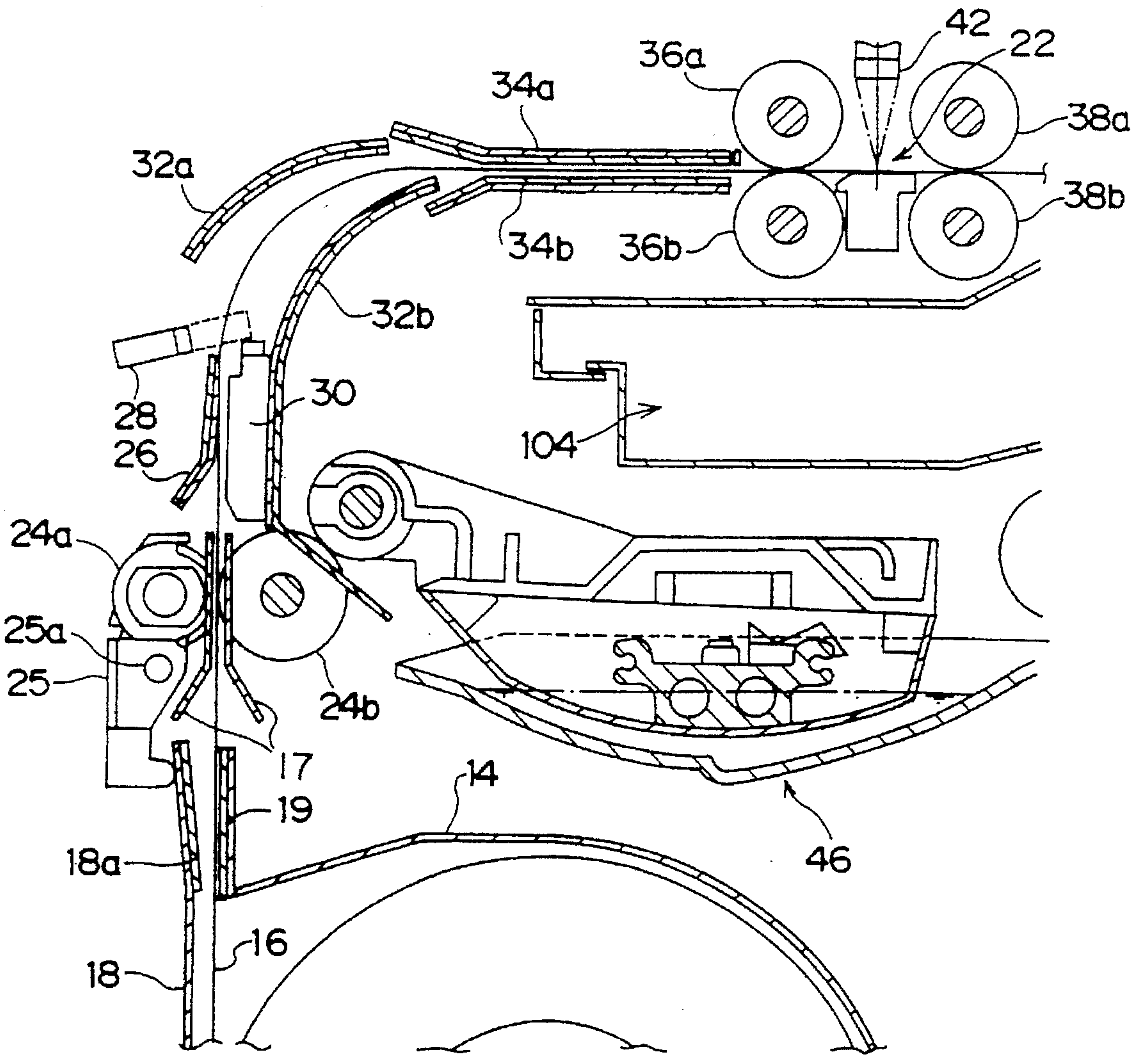
FIG. 3 is a cross sectional schematic side view showing a conveying path along which a photosensitive material is conveyed from the photosensitive material magazine to the exposure section of the image recording apparatus.
Figure 4:
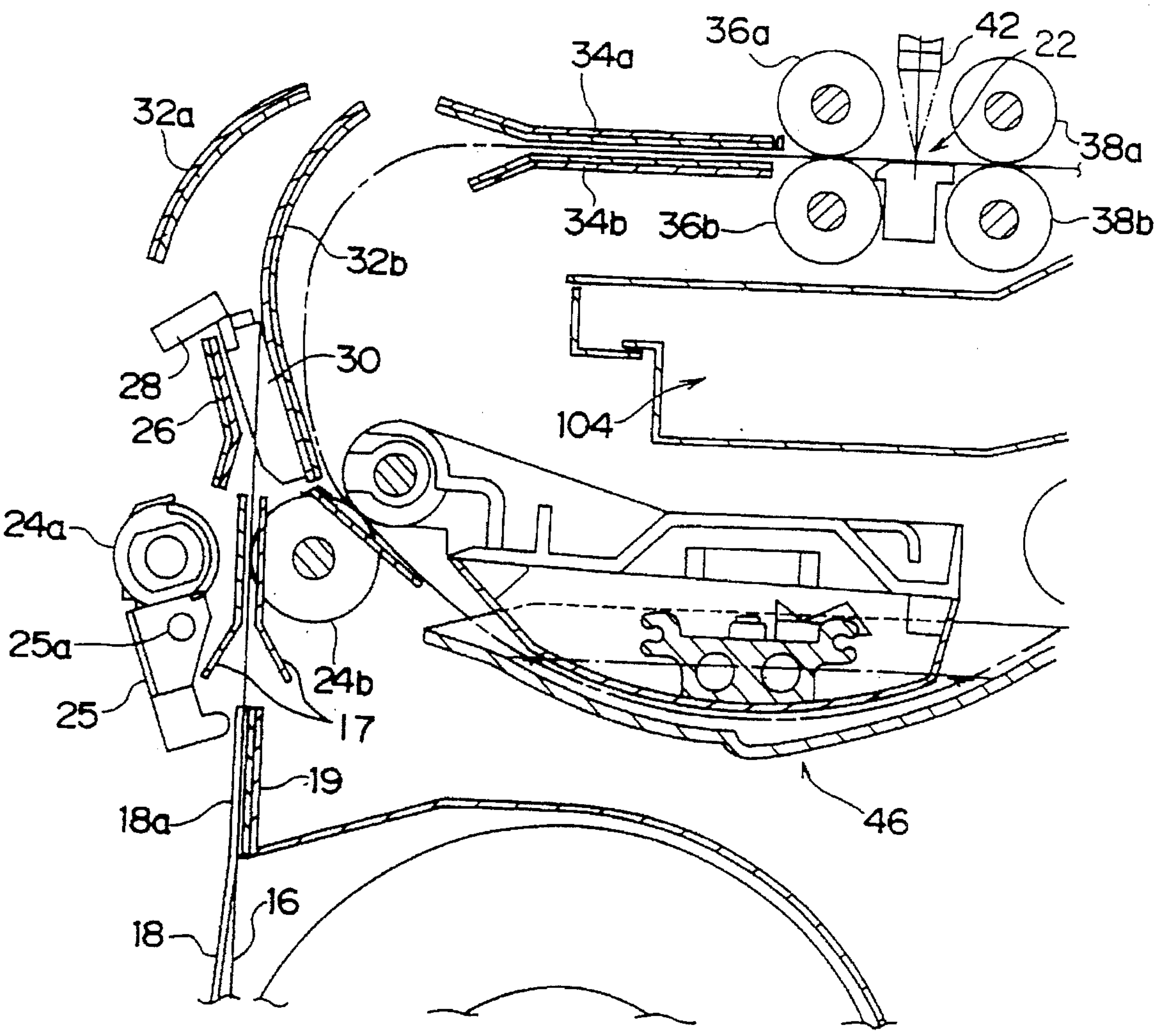
FIG. 4 is a cross sectional schematic view showing a conveying path along which a photosensitive material is conveyed from the exposure section to the water applying section of the image recording apparatus.

As shown in FIG. 3 and FIG. 4, the support 25 carrying the conveying roller 24*a* is rotatable about a stationary shaft 25*a*. The support 25 is urged by an unillustrated spring to always contact the upper edge of the holding plate 18 with pressure. When the holding plate 18 swings about the stationary shaft 20, the support 25 is rotated about the stationary shaft 25*a* in the direction opposite to the swinging direction of the holding plate 18. Consequently, when the holding plate 18 is brought into contact with the holding plate 19 with pressure (see FIG. 4), the conveying roller 24*a* is separated from the conveying roller 24*b*. When the holding plate 18 is separated from the holding plate 19 (see FIG. 3), the conveying roller 24*a* is brought into contact with the conveying roller 24*b* with pressure.

A guide plate 26 and cutting blades 28 and 30 are provided above the pair of conveying rollers 24*a* and 24*b* (see FIG. 1). When the cutting blade 28 is advanced to engage with the cutting blade 30, the photosensitive material 16 is cut thereby.

Movable guide plates 32*a* and 32*b* and stationary guide plates 34*a* and 34*b* are provided above the cutting blades 28 and 30.

Figure 5:
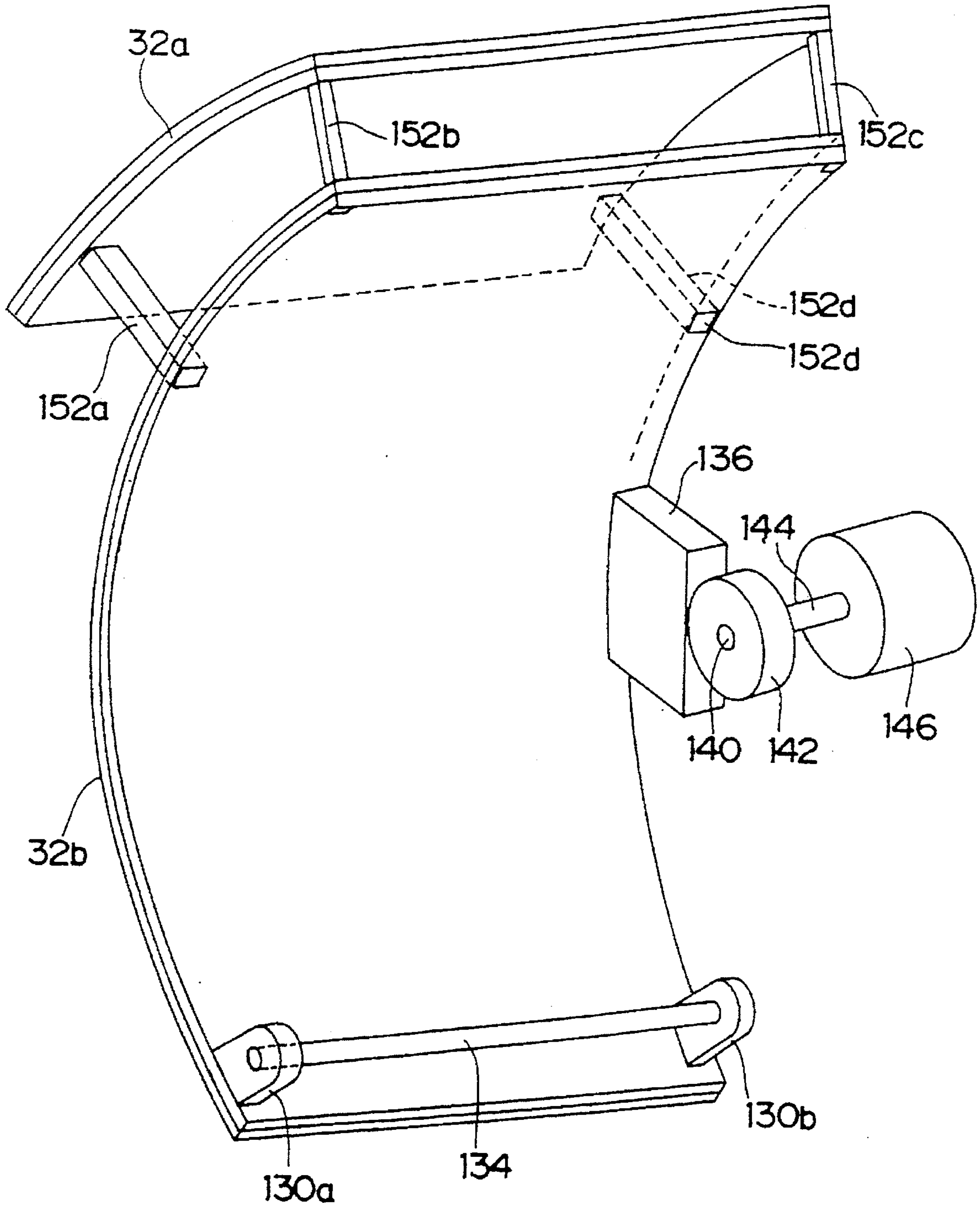
FIG. 5 is a schematic perspective view of the guide plates of the image recording apparatus.

As shown in FIG. 5, the guide plates 32*a* and 32*b* are connected with each other via four supporting rods 152*a*–152*d* such that they face each other with a predetermined clearance therebetween. A side plate 136 is attached to the guide plate 32*b*. An eccentric cam 142 is in contact with the side plate 136 with pressure. The eccentric shaft 140 of the eccentric cam 142 is connected to a motor 146 via a shaft 144. The guide plate 32*b* is urged by an unillustrated spring to always contact the eccentric cam 142 with pressure. A pair of bearing members 130*a* and 130*b* is attached to both lateral edges of the lower portion of the guide plate 32*b*, and a stationary shaft 134 is passed through the bearing members 130*a* and 130*b*. Accordingly, when the eccentric cam 142 is rotated by the motor 146 via the shaft 144, the guide plate 32*b* is swung about the stationary shaft 134. The guide plate 32*b* is swung in the right-and-left direction of the image recording apparatus 10, as shown in FIG. 3 and FIG. 4.

As shown in FIG. 1, an exposure section 22 is located between a pair of conveying rollers 36*a* and 36*b* and another pair of conveying rollers 38*a* and 38*b*. The photosensitive material 16 is passed between the conveying rollers 36*a* and 36*b* and then between the conveying rollers 38*a* and 38*b*. In synchronous with the passing movement of the photosensitive material 16, the table 212A is moved in the same direction. The passing of the photosensitive material 16 is detected by a photosensitive material detecting sensor (not illustrated) which is disposed in the vicinity of the conveying rollers 36*a* and 36*b* and which is composed of a light emitting element for emitting infrared light and a light detecting element for detecting the light emitted from the light emitting element. When the light from the light emitting element is interrupted by the photosensitive material 16, it is judged that the photosensitive material 16 starts to pass the exposure section 22.

An exposure unit 238 is provided between the exposure section 22 and the transparent glass plate 245. The exposure unit 238 includes light source 40A and a lens unit (SELFOC lens array) 42. The lens unit 42 receives a reflective image from the object 42 on the table 212A which is moved synchronous with the movement of the photosensitive material 16 and forms a corresponding image on the photosensitive surface of the photosensitive material 16.

The light source 40A is composed of two LED arrays, each of which includes LEDs for blue light, LEDs for green light and LEDs for red light linearly and alternately disposed in the widthwise direction of the object 242. The brightness and light emitting time of each LED can be controlled independently. Accordingly, it is unnecessary to dispose a color filter or an aperture adjusting mechanism on the optical axis so as to control the amount and quality of light. The amount and quality of light can be controlled by adjusting the current supplied to the LEDs. The control of light may be similarly performed using a hot-cathode tube or a cold-cathode tube.

A switchback section 44 is provided on the right side of the exposure section 22. Also, a water applying section 46 is provided above the photosensitive material magazine 14. A plurality of pipes are connected to the water applying section 46 to supply water thereto. A heat-development/transfer section 48 is disposed on the right-hand side of the water applying section 46. The photosensitive material 16 is fed into the heat-development/transfer section 48 after being applied with water.

Figure 6:
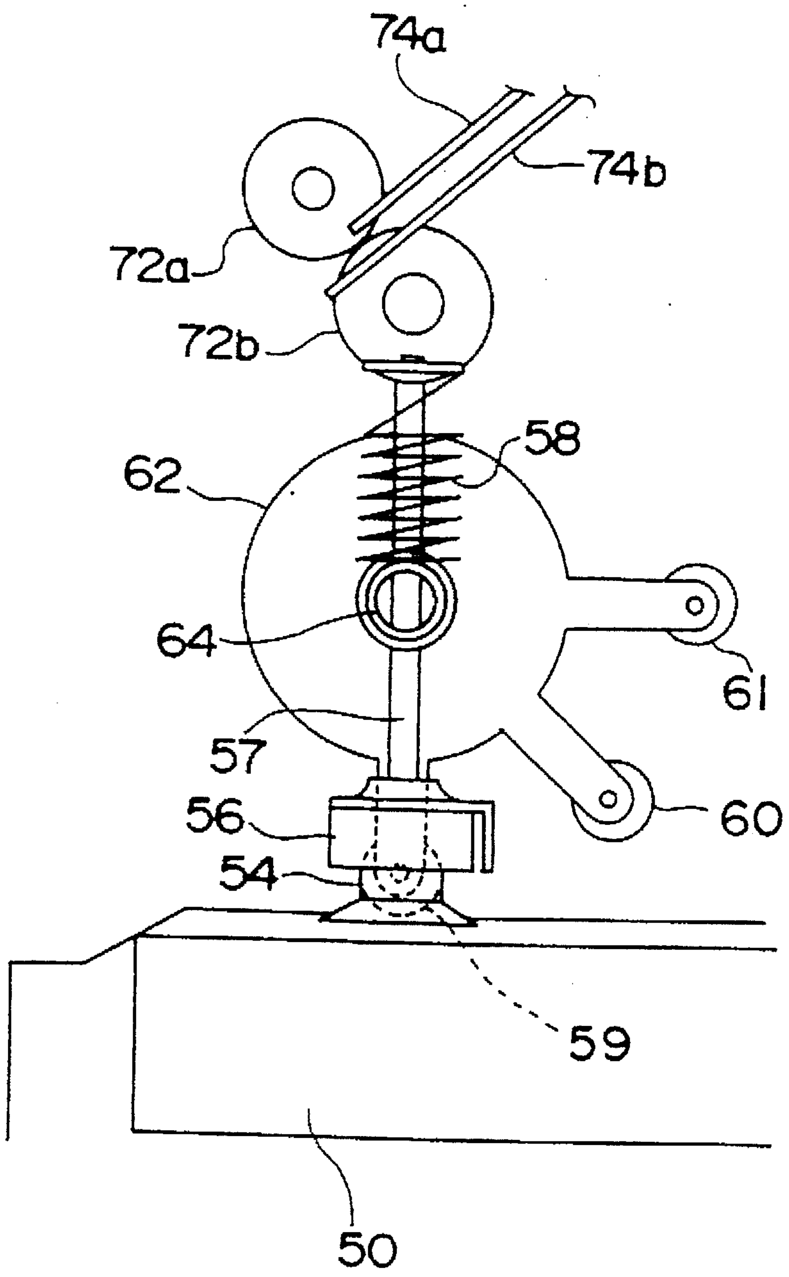
FIG. 6 is a schematic view of the sucking/conveying section of the image recording apparatus which shows the operation for sucking an image receiving material from the image receiving material magazine and for taking it out therefrom.

An image receiving material magazine 50 is provided at the bottom of the body 12 on the right-hand side of the photosensitive material magazine 14. In the image receiving material magazine 50, a plurality of pieces of an image receiving material 51 are stacked. Each piece has a predetermined length. A dye fixing material containing mordants is applied to the surface of the image receiving material 51 on which surface an image is to be formed. The plurality of pieces of the image receiving material 51 are stacked such that the image forming surfaces face downward. A sucking/conveying section 52 is disposed above the image receiving material magazine 50 to suck the image receiving material 51 and convey it to the heat-development/transfer section 48. As shown in FIG. 6, the sucking/conveying section 52 comprises a sucking unit 54 composed of an electrically driven vacuum pump for sucking the image receiving material 51, and a guide member 56 for guiding the sucking unit 54. The sucking unit 54 is mounted to the tip of a slidable support shaft 57. A spring 58 is attached to the rear end of the support shaft 57. When the spring 58 is expanded or compressed by an unillustrated drive means, the support shaft 57 is slid accordingly. The support shaft 57 is supported by a center shaft 64 of the rotary plate 62. Consequently, the supporting shaft 57 with the sucking unit 54 rotates as the rotary plate 62 rotates. The rotary plate 62 has three projections 59, 60 and 61.

In the present embodiment, the sucking unit 54 is formed by an electrically driven vacuum pump. However, the sucking unit 54 is not limited thereto and may be formed by a sucking unit having an elastic chamber with a check valve. In this case, the sucking unit is pressed against the image receiving material 51 by utilizing the drive mechanism for sliding support shaft 57, and the image receiving material 51 is released from the sucking unit 54 by opening the check valve.

A pair of conveying rollers 72*a* and 72*b* and a pair of guide plates 74*a* and 74*b* are provided above the sucking/conveying section 52. The image receiving material 51 sucked and conveyed by the sucking/conveying section 52 is further conveyed by the pair of conveying rollers 72*a* and 72*b* so that the image receiving material 51 is conveyed to the heat-development/transfer section 48 while being guided by the guide plates 74*a* and 74*b*.

The heat-development/transfer section 48 is provided with a first endless belt 86 which faces the photosensitive material 16 fed into the heat-development/transfer section 48 and which has a sufficient width to cover the photosensitive material 16 in the widthwise direction. The heat-development/transfer section 48 is also provided with a second endless belt 94 which faces the image receiving material 51 fed into the heat-development/transfer section 48 via the guide plates 74*a* and 74*b* and which has a sufficient width to cover the image receiving material 51 in the widthwise direction. Conveying rollers 82 and 90 are provided in the vicinity of the inlet N of the heat-development/transfer section 48 so as to simultaneously move the first and second endless belts 86 and 94, thereby causing the photosensitive material 16 and the image receiving material 51 to closely contact each other and feeding them inside the heat-development/transfer section 48. Conveying rollers 80 and 88 are further provided in the vicinity of the inlet N, and conveying rollers 84 and 92 are provided in the vicinity of the exit M. The first endless belt 86 is moved by the conveying rollers 80–84 while the second endless belt 94 is moved by the conveying rollers 88–92.

Figure 8:
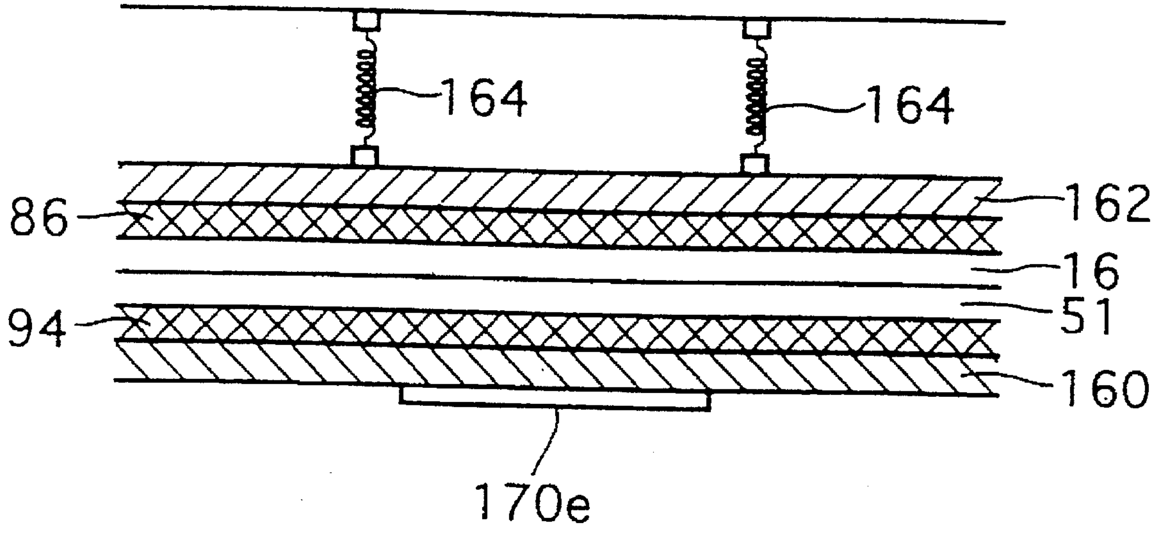
FIG. 8 is a partially cross sectional view of the heat-development/transfer section.

The first and second endless belts 86 and 94 form straight holding portions 86C and 94C along part of their paths of movement between the conveying rollers 82 and 90 and the conveying rollers 84 and 92. The photosensitive material 16 and the image receiving material 51 are held and conveyed by the straight holding portions 86C and 94C of the first and second endless belts 86 and 94. As shown in FIG. 8, a plurality of springs 164 and a pressing plate 162 are disposed above the straight holding portion 86C of the first endless belt 86. The first endless belt 86 is pressed downward by the springs 164 via the pressing plate 162. An aluminum plate 160 is disposed beneath the straight holding portion 94C of the second endless belt 94. Since the aluminum plate 160 is stationary, the photosensitive material 16 and the image receiving material 51 closely contact each other when the first endless belt 86 is pressed downward by the springs 164 via the pressing plate 162. When the first and second endless belts 86 and 94 are moved by the conveying rollers 80–92, the photosensitive material 16 and the image receiving material 51 are linearly moved while being held by the first and second endless conveyers 86 and 94 for close contact therebetween.

Figure 9:
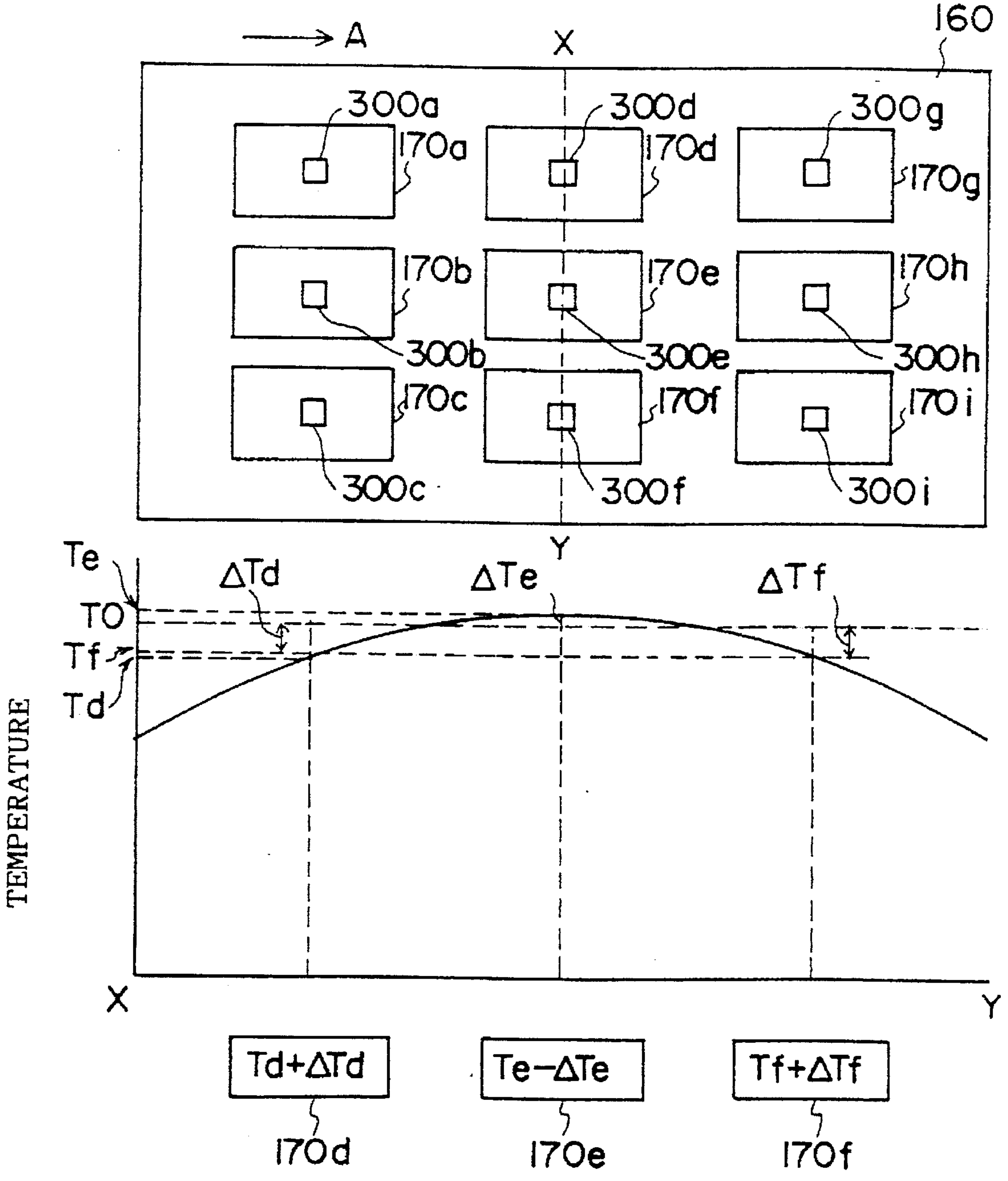
FIG. 9 is a chart showing the positional relationship between heaters and sensors provided on an aluminum plate, and the relationship between the temperature of the aluminum plate at various positions and the setting temperatures of the heaters.

As shown in FIG. 9, nine heaters 170*a*–170*i* are attached to the aluminum plate 160 in a matrix of 3×3 (i.e., 3 columns in the direction of an arrow A in which the photosensitive material 16 and the image receiving material 51 are moved, and 3 rows in a direction (perpendicularly or substantially perpendicularly) intersecting the moving direction. The heaters 170*a*–170*i* are respectively provided with sensors 300*a*–300*i* to detect their temperatures. The number of the heaters is not limited to 9. The positions of the heaters are not limited to the above, and the heaters may be attached to the aluminum plate 160 in a staggered pattern. Also, the heaters may be disposed such that the density of the heaters becomes higher at the lateral side portions of the aluminum plate 160 compared to the central portion thereof. In the present embodiment, a sensor is attached to each of the heaters 170*a*–170*i*. However, the present invention is not limited thereto. A sensor may be provided in the vicinity of each of the heaters 170*a*–170*i*. Although the aluminum plate 160 is disposed beneath the straight holding portion 94C of the second endless belt 94, the present invention is not limited thereto. The aluminum plate with heaters may be provided above the straight holding portion 86C of the first endless belt 86, or be provided above the straight holding portion 86C of the first endless belt 86 and beneath the straight holding portion 94C of the second endless belt 94.

A separating claw 95, i.e. a stripping member is provided in the vicinity of the exit M of the heat-development/transfer section 48 (see FIG. 1) so as to separate the photosensitive material 16 from the image receiving material 51. A pair of guide plates 96*a* and 96*b* is provided above the separating claw 95 to lead the photosensitive material 16 separated from the image receiving material 51 by the separating claw 95 to a pair of conveying rollers 98*a* and 98*b*. Another pair of conveying rollers 102*a* and 102*b* is provided above the conveying rollers 98*a* and 98*b*. A collecting section 104 is provided on the left-hand side of the conveying rollers 102*a* and 102*b* to collect the photosensitive material 16 which has been used for heat-development and transfer. The guide plate 96*b* has a curved shape to smoothly convey the photosensitive material 16 through the pair of conveying rollers 98*a* and 98*b* and then through the pair of conveying rollers 102*a* and 102*b*.

A pair of guide plates 106*a* and 106*b* is provided under the separating claw 95 to lead the image receiving material 51 separated from the photosensitive material 16 by the separating claw 95 to a pair of conveying rollers 108*a* and 108*b*. A tray 105 is provided on the right-hand side of the conveying rollers 108*a* and 108*b* to be located on the right-hand side of the image recording apparatus 10. The tray 105 extends toward the outside of the image recording apparatus 10 to receive the image receiving material 51 on which an image has been transferred.

Provided under the heat-development/transfer section 48 is a controller unit 110 which carries out various kinds of control.

Next, the operation of the present embodiment will be described.

First, the holding plate 18 is separated from the holding plate 19, as shown in FIG. 1 and FIG. 3. With this operation, the paired conveying rollers 24*a* and 24*b* are brought into contact with each other with pressure. After the leading edge of the rolled photosensitive material 16 is nipped by the conveying rollers 24*a* and 24*b*, the rolled photosensitive material 16 is placed in the photosensitive material magazine 14.

As shown in FIG. 1 and FIG. 3, the guide pates 32*a* and 32*b* are positioned such that the photosensitive material 16 is guided by the guide plates 34*a* and 34*b*.

Figure 7:
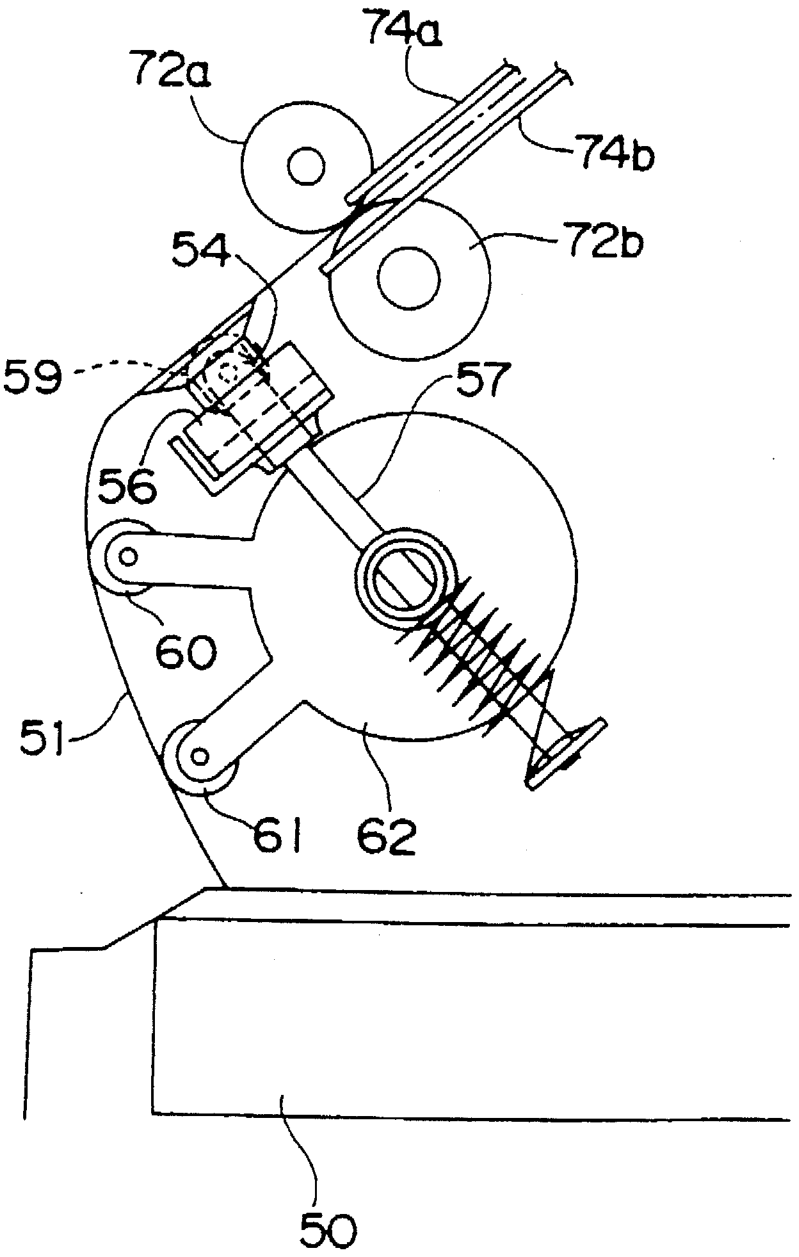
FIG. 7 is a schematic view of the sucking/conveying section of the image recording apparatus which shows the operation for transferring the image receiving material from the conveying roller to the heat-development/transfer section.

As shown in FIG. 6, the spring 58 of the sucking/conveying section 52 is expanded to slide the support shaft 57, so that the sucking unit 54 reaches the image receiving material 51 stored in the image receiving material magazine 50. After the image receiving material 51 is held by the sucking unit 54, the rotary plate 62 is rotated, as shown in FIG. 7, to convey the image receiving material 51 to the paired rollers 72*a* and 72*b*. When the image receiving material 51 enters between the rollers 72*a* and 72*b*, the sucking/conveying section 52 operates to stop the sucking by the sucking unit 54 and goes into a wait state in which the image receiving material 51 is allowed to be conveyed to the heat-development/transfer section 48 by the rotation of the conveying rollers 72*a* and 72*b*.

When a start command is inputted through the operational panel after the holding cover 212B has been closed, the image processing is started.

In detail, the conveying rollers 24*a* and 24*b* are operated to convey the photosensitive material 16 (see FIG. 1) so that the photosensitive material 16 is conveyed to the exposure section 22 with the photosensitive surface (surface to be exposed) facing upward. When the photosensitive material detecting sensor detects that the photosensitive material 16 reaches the exposure section 22, the table 212A is moved synchronous with the movement of the photosensitive material 16. Since the exposure section 22 uses a lens system including the selfoc lens array 42 whose magnification is 1, the moving speed of the table 212A is set equal to the conveying speed of the photosensitive material 16. In a mirror scan system, the table 212A is moved at a speed corresponding to the magnification of the system.

At the same time, the light source 40A of the exposure unit 238 is turned on. The brightness and light emitting time of each LED of the light source 40A is controlled in accordance with the density of an image on the object 242 and the color balance of the photosensitive material 16. Consequently, the amount and quality of light can be optimally controlled by adjusting the current supplied to the LEDs, without disposing a color filter or an aperture adjusting mechanism on the optical axis. Therefore, the structure of the exposure unit 238 can be simplified.

The light emitted from the LEDs of the light source 40A is reflected by the object 242 and enters the selfoc lens array 42 to be guided thereby. The light is then projected on a part of the photosensitive material 16 located at the exposure section 22 so as to form an image on the photosensitive material 16 by exposure (hereinafter referred to as "image exposure").

After the image exposure is started, the photosensitive material 16 is continuously conveyed to the switchback section 44 while being subjected to the image exposure. After completion of the image exposure, the conveying rollers 36*a*, 36*b*, 38*a*, 38*b*, 24*a* and 24*b* are reversely rotated to convey the photosensitive material 16 in the opposite direction until the exposed portion of the photosensitive material 16 a position just before the cutting blade 28. At this time, the rollers 36*a*, 36*b*, 38*a*, 38*b*, 24*a* and 24*b* are stopped. The holding plate 18 is swung toward the holding plate 19 so that it is brought into contact with the pressing blade 19 with pressure. Simultaneously with this, the conveying roller 24*a* is separated from the conveying roller 24*b*. The guide plates 32*a* and 32*b* are maintained at the positions shown in FIG. 3. When the cutting blade 28 is moved toward the cutting blade 30, the exposed portion of the photosensitive material 16 is cut off. The remaining part of the pulled out portion of the photosensitive material 16 is held between the holding plates 18 and 19, thereby being prevented from falling.

After the photosensitive material 16 is cut, the conveying rollers 36*a*, 36*b*, 38*a* and 38*b* are again rotated to transfer the cut portion of the photosensitive material 16 until the tail end thereof reaches the guide plates 34*a* and 34*b*. When the tail end of the photosensitive material 16 reaches the guide plates 34*a* and 34*b*, the conveying rollers 36*a*, 36*b*, 38*a* and 38*b* are stopped. Thereafter, the guide plates 32*a* and 32*b* are swung to the positions shown in FIG. 4. In this state, the photosensitive material 16 does not enter between the guide plates 32*a* and 32*b* but moves along the inner surface of the guide plate 32*b*.

The conveying rollers 36*a*, 36*b*, 38*a*, 38*b*, 24*b* and 24*c* are rotated to feed the photosensitive material 16 into the water applying section 62. The photosensitive material 16 which has been exposed is conveyed inside the guide plate 32*b* so that it reaches the conveying rollers 24*b* and 24*c*. The photosensitive material 16 on which an image of the object has been recorded is conveyed into the water applying section 46. The conveying roller 24*a* facing the conveying roller 24*b* is not in contact with the conveying roller 24*b*, as shown in FIG. 4. Accordingly, even when the conveying roller 24*b* is rotated, the unexposed portion of the photosensitive material 16 is not conveyed and is held by the holding plates 18 and 19.

At the water applying section 46, water is applied to the photosensitive material 16 while excessive water is removed by squeezing rollers 76*a* and 76*b*. Water applied to the photosensitive material 16 serves as an image forming solvent. The photosensitive material 16 is then conveyed to the heat-development/transfer section 48 by the squeezing rollers 76*a* and 76*b*.

Synchronously with the conveying of the photosensitive material 16 by the squeezing rollers 76*a* and 76*b* to the heat-development/transfer section 48, the conveying roller 72*a* and 72*b*, which was in the wait state, are rotated. With this operation, the photosensitive material 16 and the image receiving material 51 are fed between portions of the first and second endless belts 86 and 94 which are backed up by the conveying rollers 82 and 90 such that the photosensitive material 16 goes ahead of the photosensitive material 51 by a predetermined length. The photosensitive material 16 and the image receiving material 51 fed between the first and second endless conveyers 86 and 94 closely contact each other because the first endless belt 86 is pressed downward by the springs 164 via the pressing plate 162. The first and second endless belts 86 and 94 are moved by the rotation of the conveying rollers 80–84 and 88–92 so that the photosensitive material 16 and the image receiving material 51 are moved along a path formed by the straight holding portions 86C and 94C of the first and second endless belts 86 and 94 while being held thereby.

While the photosensitive material 16 and the image receiving material 51 are moved along the path formed by the straight holding portions 86C and 94C, they are heated by heat from an aluminum plate 160 which is heated by heaters 170*a*–170*i*.

The temperatures of the heaters 170*a*–170*i* are set as follows.

As shown in FIG. 1, the straight holding portions 86C and 94C are cooled by outside air from both lateral sides thereof.

Consequently, when the temperature of the aluminum plate 160 is measured along a line extending from the longitudinally central position of one lateral edge X at an intermediate portion of the straight-line movement path, i.e. a flat path portion of the endless belt in the direction shown by arrow A in FIG. 9 of movement of the photosensitive material 16 and the image receiving material 51, to the longitudinally central position of the other lateral edge Y of the aluminum plate 160 at the intermediate portion in the direction of movement shown by arrow A, the temperature reaches the maximum at the center of the line and decreases toward both lateral edges X and Y. It is to be noted that when the heating temperature becomes higher, the density of an image transferred to the image receiving material 51 increases.

On the contrary, when the heating temperature becomes lower, the density of the transferred image decreases. Accordingly, the density of the transferred image becomes higher at a position corresponding to the central portion of the aluminum plate 160 compared to positions corresponding to the side portions of the aluminum plate 160. This causes unevenness in the density of the transferred image, resulting in an unsatisfactory image.

In the present embodiment, the above-described problem is solved by properly setting the temperatures of the heaters 170*a*–170*i*. In detail, an original image having a uniform density is formed on the photosensitive material 16 by exposure, and the photosensitive material 16 is then subjected to heat-development/transfer to form an image corresponding to the original image on the image receiving material 51. The distribution of the density of the thus obtained image is measured. The target temperatures of the heaters 170*a*–170*i* are set based on the results of the measurement such that the distribution of the density of the image formed on the image receiving material 51 becomes uniform. It is assumed that the temperatures of the heaters 170*d*, 170*e* and 170*f* were Td, Te and Tf, respectively, at the time when the photosensitive material 16 with an image having a uniform density was subjected to a heat-development/transfer operation, and that a satisfactory image having a substantially uniform density can be obtained when the temperatures of the heaters 170*d*, 170*e* and 170*f* are all To. In this case, the temperatures of the heaters 170*d*, 170*e* and 170*f* are set to $Td+\Delta Td$, $Te-\Delta Te$, $Tf+\Delta Tf$, respectively, as shown in FIG. 9. The aluminum plate 160 is heated by the heaters 170*a*–170*i*, the target temperatures of which have been set in the above-described manner, so as to heat the photosensitive material 16 and the image receiving material 51.

When the photosensitive material 16 and the image receiving material 51 moved along the path are heated by the heaters 170*a*–170*i*, movable dyes are released from the photosensitive material 16 and are transferred to the dye fixing layer of the image receiving material 51 to record an image thereon.

The photosensitive material 16 and the image receiving material 51 are thereafter conveyed to the exit of the heat-development/transfer section 48, and the separating claw 95 is moved so that the separating claw 95 engages with the leading edge of the photosensitive material 16 which goes ahead of the image receiving material 51 by a predetermined amount. As a result, the leading edge of the photosensitive material 16 is led between the guide plates 96*a* and 96*b*. The photosensitive material 16 is further conveyed to the conveying rollers 98*a* and 98*b* while being guided by the guide plates 96*a* and 96*b*. The photosensitive material 16 is thereafter conveyed by the covering rollers 98*a* and 98*b* to the conveying rollers 102*a* and 102*b* while being guided by the guide plate 96*b*. The photosensitive material 16 is finally stacked up in the photosensitive material collecting section 104 by the conveying rollers 102*a* and 102*b*.

Meanwhile, the image receiving material 51 separated from the photosensitive material 16 reaches the conveying rollers 108*a* and 108*b* via the guide plates 106*a* and 106*b*. The image receiving material 51 is stacked up on the tray 105 by the conveying rollers 108*a* and 108*b*.

As described above, when the image on the photosensitive material is transferred to the image receiving material by heat-development/transfer, the photosensitive material and the image receiving material are caused to closely contact each other and are linearly conveyed. Consequently, a space for the heat-development/transfer section can be reduced compared to a conventional heat-development/transfer section in which a photosensitive material and an image receiving material are transferred and heated by a cylindrical heating drum for a heat-development/transfer operation. That is, in such conventional heat-development/transfer section requires a space for the heating drum itself and a space for conveying the photosensitive material and the image receiving material around the periphery of the heating drum. Since these spaces can be eliminated in the present invention, the heat-development/transfer section can be made compact. Accordingly, the image recording apparatus can be made compact and can be manufactured at reduced low costs.

Also, since a plurality of pieces of image receiving material which have been cut to a predetermined length are stacked in the image receiving material magazine, the space for the image receiving material magazine can be made smaller compared to an image receiving material magazine which requires a cylindrical space to store an image receiving material in a rolled state. That is, it is possible to eliminate cylindrical space for storing a rolled image receiving material, thereby making the image receiving material magazine compact. Hence the image recording apparatus can be made compact and can be manufactured at reduced low costs.

In the above-described embodiment, the photosensitive material is conveyed such that it is pulled out from the photosensitive material magazine and subsequently passed through the exposure section to form an image on the photosensitive material in the exposure section.

Accordingly, it is possible to eliminate a space for pulling out the photosensitive material by a predetermined length necessary for forming an image on the photosensitive material by exposure. Therefore, the image recording apparatus can be made compact and can be manufactured at reduced low costs.

In the above-described embodiment, the position of the photosensitive material which has been pulled out from the photosensitive material magazine is detected by the photosensitive material detecting sensor provided in the vicinity of the exposure section. However, the present invention is not limited thereto, and the position of the photosensitive material may be detected by detecting the amount of rotation of a conveying roller.

What is claimed is:

1. An image recording apparatus comprising:

a photosensitive material storing section for storing a rolled photosensitive material;

photosensitive material conveying means for pulling out the photosensitive material from said photosensitive material storing section and for conveying the pulled out photosensitive material;

an exposure section for forming an image, by exposure, on a portion of the photosensitive material which has been pulled out and conveyed by said photosensitive material conveying means;

an image receiving material storing section for storing an image receiving material;

image receiving material conveying means for conveying the image receiving material stored in said image receiving material storing section;

cutting means for cutting the photosensitive material to a predetermined length after being exposed in said exposure section;

a pair of endless belts for holding and carrying the superposed photosensitive material and the image receiving material therebetween, said pair of endless belts having opposite straight holding portions;

pressing means for pressing at least one of the straight holding portions of said pair of endless belts to cause the photosensitive material and the image receiving material held between the straight portions to closely contact each other;

heating means for heating the photosensitive material and the image receiving material held between the straight holding portions to effect heat-development and transfer;

wherein the photosensitive material and the image receiving material are held, conveyed, heated, and pressed together, at the same time, in order to effect the transfer of the image onto the image receiving material.

2. An image recording apparatus according to claim 1, wherein said photosensitive material storing section holds a portion of the photosensitive material which portion has been pulled out by said photosensitive material conveying means when the pulled out portion of the photosensitive material is not conveyed by said photosensitive material conveying means, and releases the pulled out portion of the photosensitive material when the pulled out portion is conveyed by said photosensitive material conveying means.

3. An image recording apparatus according to claim 1, wherein said image receiving material storing section stores a plurality of pieces of an image receiving material which are cut to a predetermined length and are stacked.

4. An image recording apparatus according to claim 1, wherein said image receiving material conveying means comprises a sucking unit for sucking the image receiving material stored in said image receiving material storing section with negative pressure, and a conveying unit for conveying the image receiving material sucked by said sucking unit.

5. An image recording apparatus according to claim 4, wherein said sucking unit comprises an electrically driven vacuum pump.

6. An image recording apparatus according to claim 1, wherein said image receiving material conveying means conveys the image receiving material stored in said image receiving material storing section roughly synchronously with the arrival of an exposed portion of the photosensitive material, which has been cut off by said cutting means, at said carrying means.

7. An image recording apparatus according to claim 1, wherein said photosensitive material conveying means conveys the photosensitive material such that the photosensitive material is pulled out from said photosensitive material storing section and is passed through said exposure section to form an image on the photosensitive material in said exposure section, and that an exposed portion of the photosensitive material is again passed through said exposure section, and wherein the exposed portion of the photosensitive material is cut off by said cutting means to a predetermined length and is conveyed to said carrying means.

8. An image recording apparatus according to claim 1, wherein said photosensitive material conveying means comprises:

first and second conveying rollers for pulling out the photosensitive material stored in the photosensitive material storing section and for conveying the pulled out photosensitive material;

a third conveying roller disposed facing said second conveying roller to cooperate with said second conveying roller so as to convey the photosensitive material;

guide means movable between first and second positions, said guide means, when located at the first position, causing the photosensitive material conveyed by said first and second rollers to pass through said exposure section in which an image is formed on the photosensitive material by exposure, and when located at the second position, causing the photosensitive material conveyed by said second and third conveying rollers to move to said endless conveyers; and controller means for controlling said first, second and third conveying rollers and said guide means, whereby the photosensitive material is conveyed in a state in which said guide means is located at the first position such that the photosensitive material is pulled out from the photosensitive material storing second and is conveyed and passed through said exposure section to form an image on the photosensitive material in said exposure section, and that the photosensitive material is reversely conveyed so that an exposed portion of the photosensitive material is again passed through said exposure section, and the exposed portion of the photosensitive material having a predetermined length is conveyed to said endless conveyers in a state where said guide means is located at the second position.

9. An image recording apparatus according to claim 1, wherein said heating means comprises a plurality of heating elements arranged in a planar pattern.

10. An image recording apparatus according to claim 1, wherein said heating means comprises a plurality of heating elements arranged in a matrix.

11. An image recording apparatus according to claim 1, wherein said heating means comprises a plurality of heating elements arranged in a staggered pattern.

12. An image recording apparatus according to claim 1, wherein said heating means comprises a plurality of heating elements which are arranged such that the density of the heating elements becomes higher at the side portions of said pressing means compared to the central portion thereof.

13. An image recording apparatus according to claim 1, wherein said heating means heats the photosensitive material and the image receiving material such that the planar distribution of heat becomes substantially uniform when the heat-development and transfer are effected for the photosensitive material and the image receiving material.

14. An image recording apparatus according to claim 1, wherein said heating means forms an original image having a uniform density on the photosensitive material by exposure, passes the photosensitive material between said straight holding portions of said endless conveyers to form an image corresponding to the original image on the image receiving material, measures the distribution of the density of the thus obtained image, sets the target temperatures of the plurality of heating elements based on the results of the measurement such that the distribution of the density of the image formed on the image receiving material becomes uniform, and heats the photosensitive material and the image receiving material at the set target temperatures.

15. An image recording apparatus according to claim 1, wherein said pressing means presses, by an extension force of a spring, at least one of said straight holding portions of said pair of endless belts to cause the photosensitive material and the image receiving material held between said straight holding portions to closely contact each other.

16. An image recording apparatus according to claim 1, further comprising:

separating means for separating the photosensitive material and the image receiving material from each other, which have been subjected to heat-development/transfer in a superposed state;

a photosensitive material collecting section provided inside said image recording apparatus for collecting the separated photosensitive material; and an image receiving material collecting section provided outside said image recording apparatus for collecting the separated image receiving material.

17. An image recording apparatus according to claim 1 wherein said heating means comprises:

a heating member which is disposed adjacent to at least one of said pair of endless belts such that said pair of endless belts moves along said heating member in close contact therewith so as to heat the entire area of the superposed photosensitive material and image receiving material; and wherein said heating member is provided with a plurality of heaters arranged in a planar pattern and a plurality of temperature detecting sensors provided for the respective heaters, and heating control means is provided to control said heaters, based on the temperatures detected by said temperature detecting sensors, such that the planar distribution of heat applied to the photosensitive material and the image receiving material becomes roughly uniform during a heat-development/transfer operation.

18. An image recording apparatus according to claim 17, wherein said heaters are disposed in a matrix.

19. A heating method for an image recording apparatus in which an image is formed on a photosensitive material by exposure, and the photosensitive material is then superposed on an image receiving material and is passed along a heating path to effect heat-development and transfer of the image so as to form an image on the image receiving material, wherein said heating path is formed by:

a pair of endless belts which move to hold and convey the superposed photosensitive material and image receiving material; and a heating member which is disposed adjacent to at least one of the endless belts such that the pair of endless belts moves along said heating member in close contact therewith so as to heat the entire area of the superposed photosensitive material and image receiving material; and wherein said heating member is provided with a plurality of heaters arranged in a planar pattern and a plurality of temperature detecting sensors provided for the respective heaters, and control means is provided to control said heaters, said control means controlling the distribution of heat applied to the photosensitive material and the image receiving material during a heat-development/transfer operation being controlled by the steps of:

forming an original image having a uniform density on the photosensitive material by exposure;

passing the photosensitive material between the straight holding portions of said pair of endless belts to form an image corresponding to the original image on the image receiving material, the photosensitive material and the image receiving material being held, conveyed, heated, and pressed together, at the same time, in order to effect the transfer of the original image onto the image receiving material;

measuring the distribution of the density of the thus obtained image;

setting the target temperatures of the plurality of heating elements based on the results of the measurement such that the distribution of the density of the image formed on the image receiving material becomes uniform; and controlling said heaters such that the temperatures of said heaters become the target temperatures.

20. A heating method according to claim 19, wherein said heaters are disposed in a matrix.

* * * * *